US011919103B2

(12) United States Patent
Liu et al.

(10) Patent No.: US 11,919,103 B2
(45) Date of Patent: Mar. 5, 2024

(54) LASER WELDING, CLADDING, AND/OR ADDITIVE MANUFACTURING SYSTEMS AND METHODS OF LASER WELDING, CLADDING, AND/OR ADDITIVE MANUFACTURING

(71) Applicant: Illinois Tool Works Inc., Glenview, IL (US)

(72) Inventors: Shuang Liu, Appleton, WI (US); Erik Miller, Verona, WI (US); Brian Doyle, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/655,597

(22) Filed: Jul. 20, 2017

(65) Prior Publication Data

US 2018/0021887 A1   Jan. 25, 2018

Related U.S. Application Data

(60) Provisional application No. 62/365,555, filed on Jul. 22, 2016.

(51) Int. Cl.
 B23K 26/06 (2014.01)
 B23K 26/082 (2014.01)
 (Continued)

(52) U.S. Cl.
 CPC ...... B23K 26/0665 (2013.01); B23K 26/0626 (2013.01); B23K 26/0648 (2013.01);
 (Continued)

(58) Field of Classification Search
 CPC .............. B23K 26/0665; B23K 26/082; B23K 26/142; B23K 26/0648; B23K 26/0626;
 (Continued)

(56) References Cited

U.S. PATENT DOCUMENTS 4,980,535 A    12/1990 Aiello
5,211,327 A    5/1993 Clarke et al.
(Continued)

FOREIGN PATENT DOCUMENTS

DE      10210005896       10/2010
WO   WO-2015135715 A1 *  9/2015    ......... B23K 26/0604
WO   WO-2016102757 A1 *  6/2016    ......... B23K 26/0624

OTHER PUBLICATIONS

Specification sheet, Nov. 3, 2014, 3 pages.
(Continued)

Primary Examiner — Hung D Nguyen
(74) Attorney, Agent, or Firm — McAndrews, Held & Malloy, Ltd.

(57) ABSTRACT

Systems and methods of a laser welding device are disclosed. The laser welding device includes a laser generator configured to generate welding-type lasing power. A lens focuses the welding-type lasing power at a focal point on a workpiece to generate a puddle during a welding-type operation. A wire feeder is configured to feed wire to the puddle generated by the laser generator. A laser scanner controls the lens to move the focal point of the welding-type lasing power in multiple dimensions over the workpiece during the welding-type operation. In some examples, the feed wire is used in an additive manufacturing process.

20 Claims, 13 Drawing Sheets

(51) Int. Cl.
*B23K 26/142* (2014.01)
*B23K 26/342* (2014.01)
*B23K 26/244* (2014.01)
*B23K 26/32* (2014.01)
*B23K 103/00* (2006.01)

(52) U.S. Cl.
CPC .......... *B23K 26/082* (2015.10); *B23K 26/142* (2015.10); *B23K 26/342* (2015.10); *B23K 26/244* (2015.10); *B23K 26/32* (2013.01); *B23K 2103/50* (2018.08)

(58) Field of Classification Search
CPC .............. B23K 2103/50; B23K 26/035; B23K 26/046; B23K 26/342; B23K 26/21; B23K 26/244; B23K 26/32; Y02P 10/25
See application file for complete search history.

(56) References Cited

U.S. PATENT DOCUMENTS

| | | | |
|---|---|---|---|
| 5,665,255 A | 9/1997 | Busuttil | |
| 6,861,613 B1* | 3/2005 | Meiners | B29C 64/153 219/121.65 |
| 7,663,791 B2 | 2/2010 | Krupkin et al. | |
| 9,381,954 B2 | 7/2016 | Werum | |
| 2002/0041444 A1* | 4/2002 | Kahlert | G02B 3/005 359/618 |
| 2003/0089691 A1* | 5/2003 | Tanaka | B23K 26/0604 219/121.67 |
| 2004/0134894 A1* | 7/2004 | Gu | B23K 26/04 219/121.68 |
| 2005/0067388 A1* | 3/2005 | Sun | B23K 26/0622 219/121.61 |
| 2011/0297685 A1 | 12/2011 | Peters et al. | |
| 2014/0008343 A1 | 1/2014 | Ash | |
| 2015/0283638 A1 | 10/2015 | Henry et al. | |
| 2015/0315710 A1 | 11/2015 | Penn et al. | |
| 2016/0175975 A1* | 6/2016 | Lattner | B23K 9/124 219/137.71 |
| 2017/0282294 A1* | 10/2017 | Uchida | B23K 26/0626 |
| 2017/0304923 A1* | 10/2017 | Ash | B23K 9/1093 |

OTHER PUBLICATIONS

Laser Mechanisms Inc., Rotary Wedge Scanner Controller Installation and Operation Manual, 21 pages.
Laser Mechanisms, Inc., Rotary Wedge Scanner spec sheet, 2 pages.
PCT, Notification Concerning Transmittal of International Preliminary Report on Patentability, dated Jan. 31, 2019, 9 pages.
Canadian Office Action Appln No. 3,030,299 dated Dec. 27, 2019.
Canadian Office Action Appln No. 3,030,299 dated Nov. 12, 2020.
Zhang, K. et al. "Study on Scanning Pattern during Laser Metal Deposition Shaping". Conference Proceedings—Second International Conference on Intelligent Computation Technology and Automation. vol. 4, pp. 668-671, https:/lieeexplore.ieee.org/iel5/5287 481/5288192105288386. Ddf. Oct. 10, 2009 (Oct. 10, 2009).
Hofmann, K.. et al .• "Development of wire based laser alloying process for highly stressed surfaces of hot forming steel tools", Lasers in Manufacturing Conference 2015. pp. 10 pgs. in total. https://www.wlt.dellim/Proceedings2015/StickIPDF/Contribution242_final.pdf. 2015.

* cited by examiner

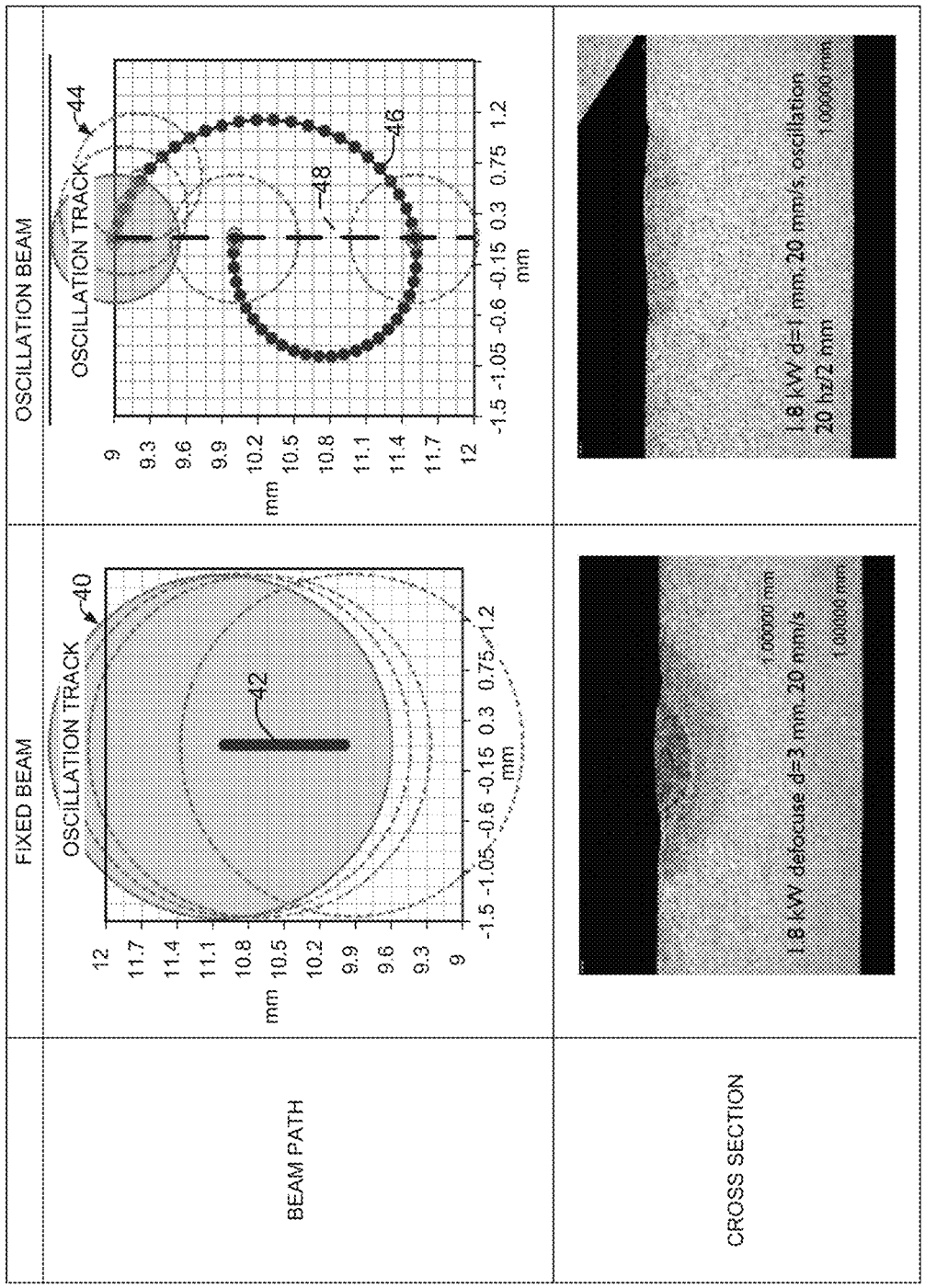

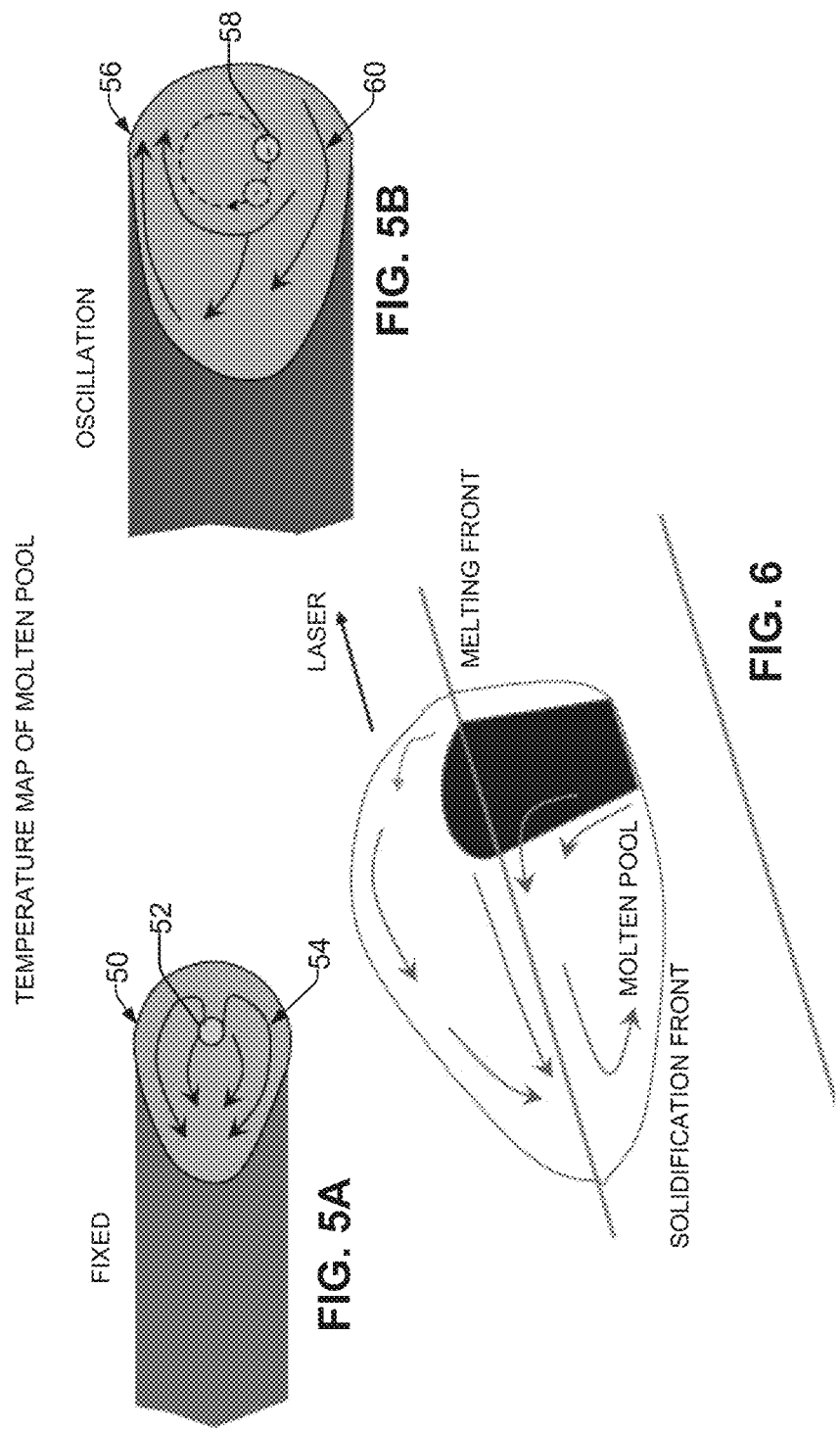

MICROSTRUCTURE OF CLADS
FIXED BEAM

MICROSTRUCTURE OF CLADS
OSCILLATION BEAM

LASER WELDING, CLADDING, AND/OR ADDITIVE MANUFACTURING SYSTEMS AND METHODS OF LASER WELDING, CLADDING, AND/OR ADDITIVE MANUFACTURING

CROSS-REFERENCE TO RELATED APPLICATIONS

This patent application claims priority to and the benefit of U.S. Provisional Patent Application Ser. No. 62/365,555, filed on Jul. 22, 2016, which is incorporated herein by reference in its entirety.

BACKGROUND

Welding is a process that has historically been a cost effective joining method. Welding is, at its core, simply a way of bonding two pieces of parent material. Laser welding is a welding technique used to join multiple pieces of metal through the use of a laser. The beam provides a concentrated heat source, enabling a precise control of the heat input and high welding speed, creating a weld with low heat input, and a small heat affected zone. In various applications, filler metal may be needed for different purposes such as filling up the gap, reinforcing the joint, overlaying the substrate surface, building up an object, or acting as a buffering medium. The filler material can be brought into the molten pool, either by pre-deposited layer, or by feeding powder or wire.

Conventional laser-based welding processes use a fixed beam with filler metal. Fixed beam laser welding systems can cause intense, localized heat that can cause damage to various materials. Thus, a system and/or method that improves on conventional laser based welding systems is desirable.

SUMMARY

This disclosure relates generally to laser welding systems, methods, and apparatuses. More particularly, this disclosure relates to laser welding, cladding, and/or additive manufacturing systems and methods of laser welding, cladding, and/or additive manufacturing employing a continuously fed electrode wire to be preheated for use in laser welding systems and process, substantially as illustrated by and described in connection with at least one of the figures, as set forth more completely in the claims.

BRIEF DESCRIPTION OF THE DRAWINGS

FIG. 4A illustrates a beam path of a fixed laser beam and a cross-sectional view of a workpiece, and FIG. 4B illustrates an example beam path of an oscillating laser beam and a cross-sectional view of a workpiece, in accordance with aspects of this disclosure.

FIG. 5A illustrates a weld puddle created by a fixed laser beam, and FIG. 5B illustrates an example weld puddle created by an oscillating laser beam, in accordance with aspects of this disclosure.

FIG. 6 illustrates a representation of a weld puddle, in accordance with aspects of this disclosure.

DETAILED DESCRIPTION

Figure 1:
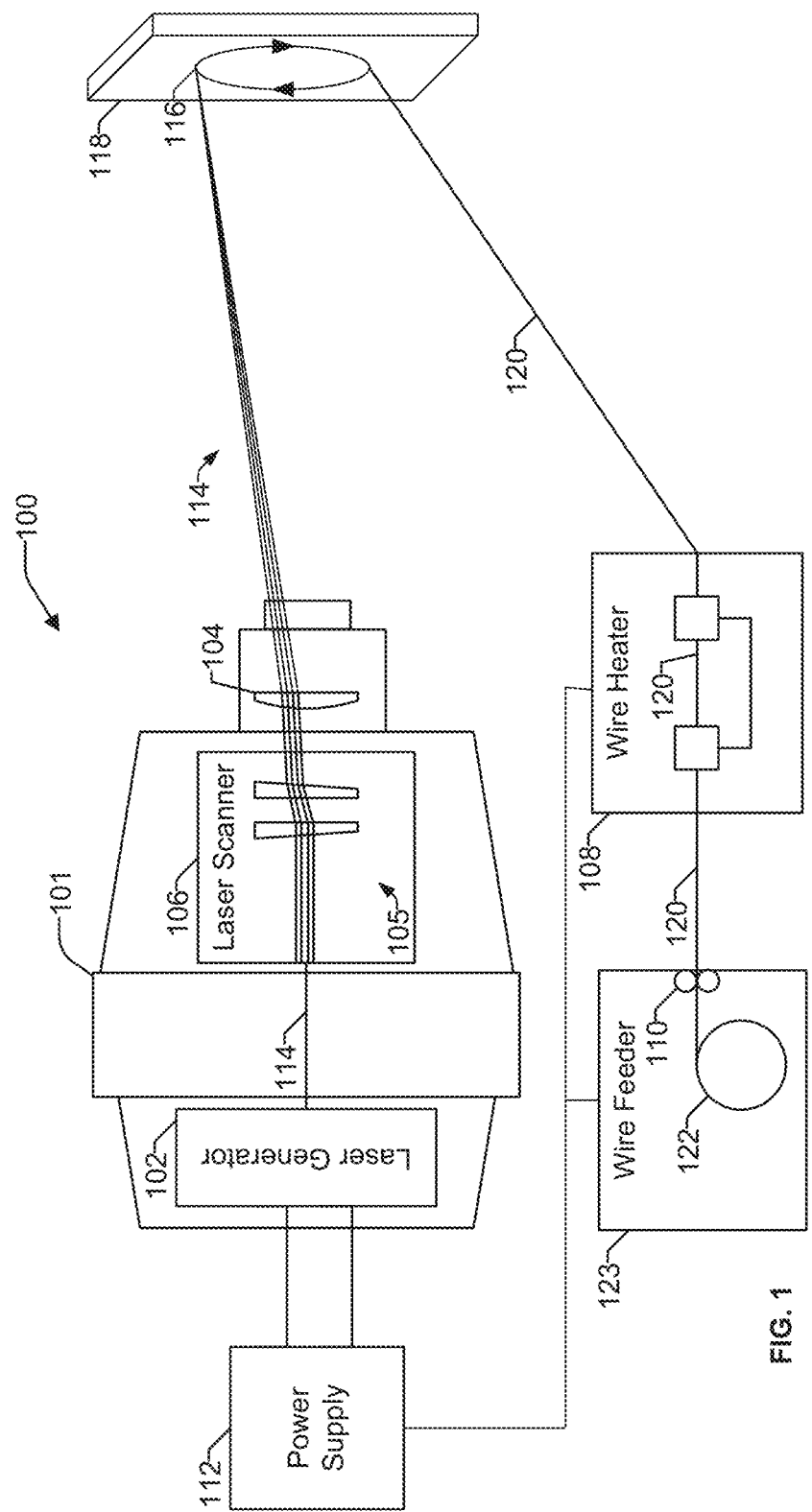
FIG. 1 is a schematic diagram of an example laser welding, cladding, and/or additive manufacturing system in accordance with aspects of this disclosure.

Disclosed example systems and methods may be used to perform welding, cladding, additive processes, and/or other types of welding-type operations. In particular, disclosed examples include rotating, oscillating, or otherwise moving the focal point of a welding-type laser (e.g., a laser emitting light wavelengths that are advantageous for welding, cladding, etc.) in multiple directions with respect to weld path to control the heating and/or cooling speeds of the weld puddle. In some examples, a laser scanner rotates the laser focal point in a circle (or other geometry). The rotating focal point induces heat input into a puddle with a controllable heat distribution. The convection inside the puddle is improved. When a large puddle is needed the laser intensity can be maintained high while laser power is kept at low level. In comparison, when a large puddle is needed with a fixed beam, the laser power needs to be increased to maintain certain laser intensity (laser intensity=laser power/laser beam size). The rotating focal point induces the preheating and post-heating effects of the puddle.

Disclosed example methods for laser welding and/or laser cladding can be used to avoid crowning in a finished weld, in which the top of the weld crown runs over the edges of the weld crown.

Disclosed examples have substantial advantages when used in additive manufacturing. For example, the laser additive manufacturing devices and processes disclosed herein use wire, which results in fewer environmental hazards than additive manufacturing using powdered substrates and/or binders. Disclosed examples have improved stability when adding layers of material in additive manufacturing over conventional methods. In examples, the total heat input is greatly reduced so that the thermal distortion and residual stress will be reduced. The puddle is controlled at relatively small size so that the collapse and drooping issues can be greatly improved.

For the purpose of promoting an understanding of the principles of the claimed technology and presenting its currently understood best mode of operation, reference will be now made to the examples illustrated in the drawings, and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means serving as an example, instance, or illustration. The examples described herein are not limiting, but rather are exemplary only. It should be understood that the described examples are not necessarily to be construed as preferred or advantageous over other examples. Moreover, the term "examples" does not require that all examples of the disclosure include the discussed feature, advantage, or mode of operation.

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, the term "welding-type operation" includes to a welding operation and/or a cladding operation.

As used herein, the term "additive manufacturing" refers to constructing a workpiece or product by repeatedly adding layers of material and binding the layers to previous layers. Disclosed examples may be used to perform additive manufacturing using wire (e.g., a solid wire, a metal core wire, etc.) as the material and binding layers of the wire to other layers using laser energy (e.g., to weld or otherwise fuse each layer of wire to prior layers).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the wire prior to a welding arc and/or deposition in the travel path of the wire.

FIG. 1 is a schematic diagram of an example laser welding system 100. The example laser welding system 100 of FIG. 1 is capable of improved welding and/or cladding operations compared to conventional welding and/or cladding operations, by improved puddle convection, increased gap tolerance, mitigating porosities, refined grain size, creating smaller heat affected zone, reduced thermal distortion, reduced residual stress, evened distribution of filler material in the welding or cladding seam.

The example laser welding system 100 of FIG. 1 includes a laser processing head 101, a laser generator 102, a lens 104, one or more optics 105 integrated with a laser scanner 106, a wire heater 108, a wire feeder 123, and a power supply 112.

The laser generator 102 generates welding-type lasing power 114 (e.g., directed light energy) based on input power received from the power supply 112. The laser generator 102 may be a light emitting diode-type laser or any other type of laser generator. As used herein, welding-type lasing power refers to lasing power having wavelength(s) that are suitable for delivering energy to metal for welding or cladding.

The lens 104 focuses the welding-type lasing power 114 at a focal point 116 on a workpiece 118. The welding-type lasing power 114 heats the workpiece 118 to generate a puddle during welding and/or cladding operations. The wire feeder 123 uses rollers 110 to feed wire 120 (e.g., filler wire, cladding material, metal additive) to the puddle generated by the lasing power. The wire 120 melts into the puddle. The wire 120 may be fed from a wire supply 122, such as a wire reel or wire supply drum.

The wire heater 108 preheats the wire 120 at a location in a wire feed path (e.g., between the wire supply 122 and the workpiece 118) that is prior to the wire tip (e.g., the end of the wire proximate the puddle). In this example, the preheating process is referred to as hot wire. The example wire heater 108 receives power from the power supply 112 and uses resistive (e.g., $I_2R$) heating that passes an electrical current through a portion of the wire 120 to generate heat by the resistance of the wire 120. However, the wire heater 120 may use other methods of heating, such as induction heating, infrared heating, and/or any other wire heating method. Example implementations of the wire heater 108 are described in U.S. Patent Publication No. 2015/0083702 to Scott et al. The entirety of U.S. Patent Publication No. 2015/0083702 is incorporated herein by reference.

During a welding process, the laser scanner 106 controls the laser beam to move the focal point 116 of the welding-type lasing power 114 in multiple dimensions over the workpiece 118 (e.g., by lens 104) during welding or cladding. The example laser scanner 106 may be any type of remote laser scanning head using reflective optics. The laser scanner 106 of FIG. 1 can be a remote scan head with reflective optics rotary wedge scanner with transmissive optics, such as the Rotary Wedge Scanner sold by Laser Mechanisms, Inc. By moving the focal point 116 in multiple directions, the laser scanner 106 can induce one or more beneficial effects in the lateral direction while welding, instead of only in the longitudinal direction. Examples of such beneficial effects that can be induced in the lateral direction include agitating or stirring of the puddle laterally to improve filler mixing, creating a heat gradient in the puddle in at least a partially lateral direction to induce movement and improve puddle wetting, and/or controlling the heating and/or cooling rates of the puddle in at least a partially lateral direction by controlling where heat is concentrated.

Figure 2:
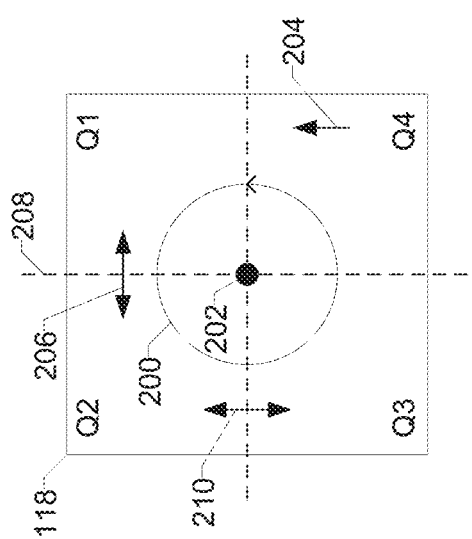
FIG. 2 illustrates an example pattern that may be used by a laser scanner to move the focal point of a laser beam in multiple dimensions over the workpiece, in accordance with aspects of this disclosure.

The laser scanner 106 is configured to move the focal point 116 in a pattern with respect to a reference point 202 of the lens 104. FIG. 2 illustrates an example pattern 200 that may be used by the laser scanner 106 to move the focal point 116 in multiple dimensions over the workpiece 118. The pattern 200 illustrated in FIG. 2 is a circular pattern, but other patterns may also be used. It should be noted, however, any desired pattern may be utilized, and the laser scanner 106 may be adapted to implement these patterns, among others. The desired pattern may include, but is not limited to, a pattern with one or more straight lines and/or one or more curves. In some embodiments, the desired pattern may include a pause or break in the pattern, such as a time interval in which the laser scanner 106 does not move the focal point 116. The desired pattern may include a circle, an ellipse, a zigzag, a FIG. 8, a transverse reciprocating line, a crescent, a triangle, a square, a rectangle, a non-linear pattern, an asymmetrical pattern, a pause, or any combination thereof. As may be appreciated, a pattern or a combination of patterns may be used and optimized for particular welds and/or welding positions. The movement of the focal point 116 and the relative movement between the workpiece 118 and the laser scanner 106 (e.g., by moving the workpiece 118 against a direction of welding 204) cause the focal point 116 to trace a superimposed pattern over the workpiece 118. The example pattern may be traced by the laser using the laser scanner 106 to agitate the puddle.

In some examples, the system 100 includes one or more air knives keep the laser scanner 106 (e.g., the optics of laser scanner 106) clean, and/or remove smoke and/or spatter from the area proximate the puddle.

Disclosed examples may be used to perform additive processes. For example, the pattern traced by the lasing power 114 via the laser scanner 106 may be adjusted in different patterns and/or diameters to perform an additive manufacturing process. In welding, cladding, and/or additive manufacturing, the wire 120 is be fed to the puddle at preheated (e.g., hot) and/or non-preheated (e.g., cold) temperatures. The laser scanner 106 and/or the laser generator 102 control the lasing power 114 to melt the wire 120 enough to fuse a layer of wire 120 to a lower layer while controlling the heating and/or cooling rates to avoid unnecessarily melting lower layers and destabilizing the manufactured product.

As illustrated in FIG. 2, the pattern 200 includes movement in a lateral direction 206 (e.g., a direction transverse or perpendicular to a weld or cladding path 208) and movement in a longitudinal direction 210 (e.g., a direction parallel with the weld or cladding path 208). The focal point 116 may be directed in a clockwise direction and/or in a counterclockwise direction along the pattern. To generate the example circular pattern 200 shown in FIG. 2, the laser scanner 106 oscillates the focal point 116 in the lateral direction 206 and in the longitudinal direction 210. Although illustrated as circular in FIG. 2, the movement can be generated in any pattern desired to create the desired effect (e.g., heating profile, weld rate, etc.).

In some cases, at a start of a welding or cladding operation, the laser scanner 106 controls the focal point 116 to traverse the wire 120. By traversing the wire 120, the lasing power 114 severs a portion of the wire 120 (e.g., a portion of the wire 118 including the wire tip proximate the workpiece 118). The wire feeder 123 and the wire 120 are oriented to feed the wire 120 such that the severed portion of the wire 120 falls into the puddle, where the severed portion of the wire is melted as heat is added to the puddle.

Figure 3B:
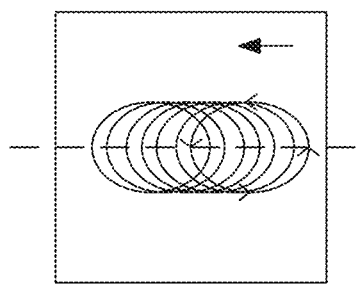
FIGS. 3A and 3B illustrate an example superimposed pattern traced over a workpiece with the focal point of the lasing power of FIG. 1, in accordance with aspects of this disclosure.
Figure 3A:
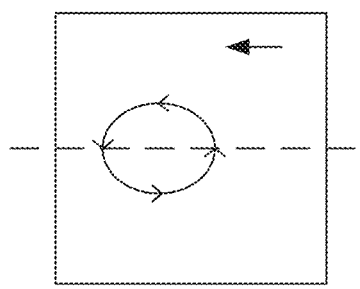

FIGS. 3A and 3B illustrate an example superimposed pattern 300 traced over a workpiece with the focal point 116 of the lasing power 114 of FIG. 1. As illustrated in FIG. 3A, the combination of a circular pattern used by the laser scanner 106 to move the focal point 116 and the movement of the workpiece 118 causes an elongated pattern to be traced over the workpiece. As the laser scanner 106 moves the focal point 116, the lasing power 114 creates a heat gradient in the weld puddle. The changing heat gradient changes the surface tension of the puddle, inducing a stirring effect, thereby improving the resulting weld.

In some examples, the laser generator 102 adjusts the power level of the lasing power 114 and/or the laser scanner 106 adjusts a rotation speed of the laser scanner 106 and/or a size of a focal area in which the focal point 116 is limited (e.g., the radius of the pattern 200) based on a location of the focal point 116 with respect to a reference point. For example, the lasing power level, the rotation speed of the laser scanner 106, and/or the focal area size may be modified to achieve a desired puddle effect and/or to affect the heating and/or cooling rates of the puddle. Additionally or alternatively, the laser generator 102 and/or the laser scanner 114 may adjust the power level of the lasing power 114, the rotation speed of the laser scanner 106 and/or the size of the focal area in which the focal point 116 is limited based on a gap size determined by a gap sensor that monitors the gap width ahead of the laser.

As shown in FIG. 4A, a weld generated by a fixed laser beam 40 traverses a joint between two workpieces along a beam path such that the center of the laser beam 42 aligns with the centerline at the joint. In other words, the path of the laser beam 40 directly follows the joint between the two workpieces.

By contrast, an oscillating or moving laser beam 44 performs a weld by advancing over the joint not in a fixed beam pathway, but by moving the beam path about the centerline 48 as the beam 44 advances, as illustrated in FIG. 4B. In an example, a laser beam 44 can be rotated about a centerline in a substantially circular manner. The laser beam 44 is rotated in a circular fashion such that a portion of the beam 44 overlaps the joint between two workpieces as the laser beam 44 advances along the joint.

In some examples, the oscillating beam 44 has a smaller diameter than a fixed beam 40. As the beam 44 is rotated about the joint, the edge of the oscillating beam 44 may stay within a distance from the centerline 48 that is similar to the wider, fixed laser beam 40.

In examples, the oscillating beam 44 has a power level and rate of travel substantially equivalent to a fixed laser beam 40 that is used to perform a similar weld. In other examples, the power level and rate of travel can be changed to achieve a desired result.

Advantageously, the movement of the oscillating laser beam 44 dissipates the heat over a wider area. The heat affected zone is smaller and the heat distribution across the weld is more uniform. As shown in FIG. 4B, the center of the oscillating laser beam 44 crosses the centerline 48 (e.g., the joint) as it rotates and advances. As shown in the graphical data represented in FIGS. 7A to 7E, these points correspond to temporary peaks in temperature, whereas a fixed beam will keep the intense temperature at the joint continuously, as shown in FIG. 8.

As shown in the example of FIGS. 5B and 6, as the oscillating laser beam 58 advances, the molten metal 56 is "stirred" in a generally clockwise manner 60. The circular movement of the oscillating laser beam 58 creates a current 60 within the puddle 56. For instance, the molten metal flows in a rotational pattern influenced by the beam's movement. By contrast, as shown in FIG. 5A, molten metal 50 in the wake of a fixed beam 52 flows rearward from both sides of the beam, illustrated by the currents 54.

Figure 7A:
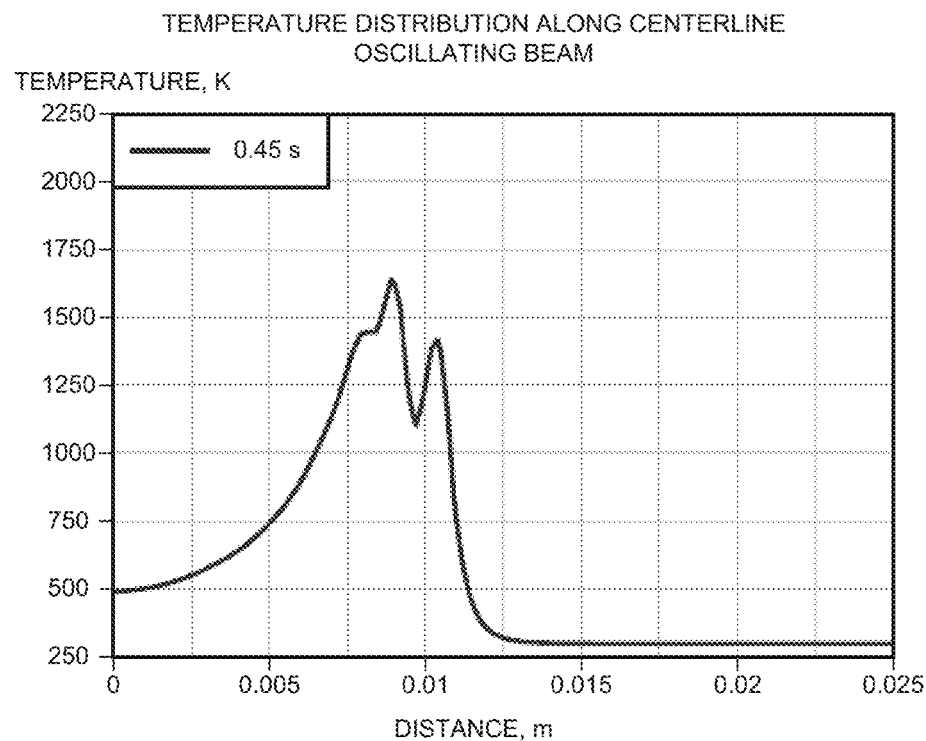
FIGS. 7A-7E illustrate example data generated by an oscillating laser beam, in accordance with aspects of this disclosure.
Figure 7B:
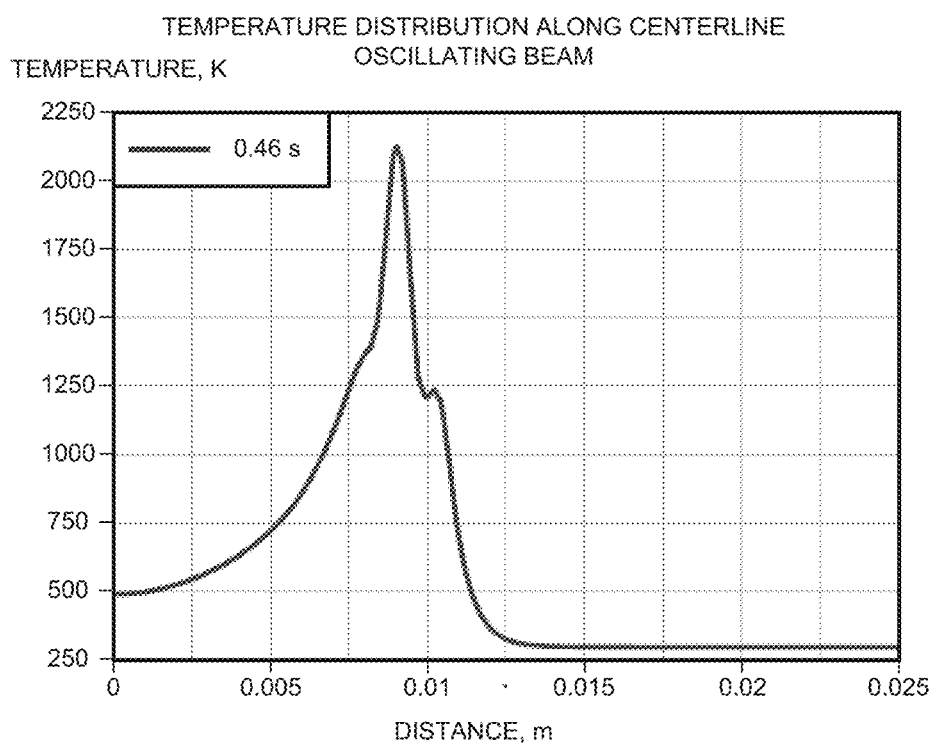
Figure 7C:
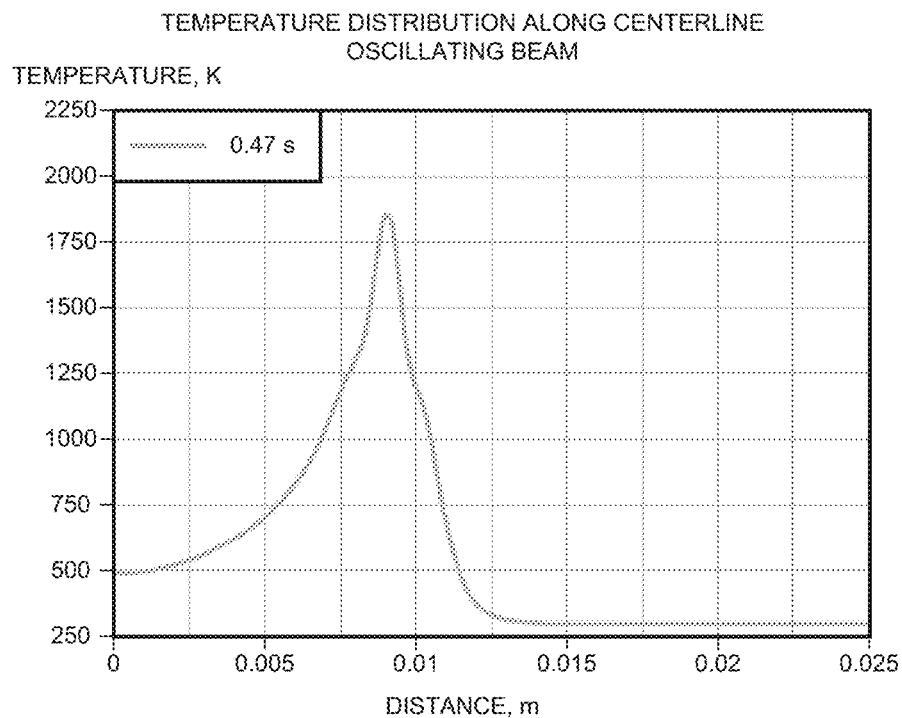
Figure 7D:
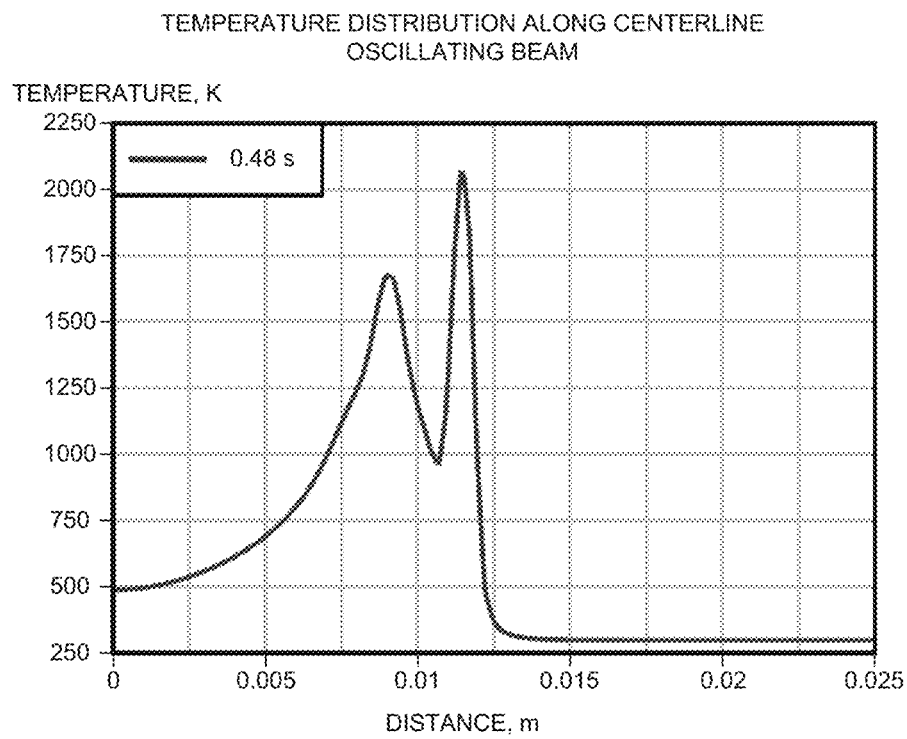
Figure 7E:
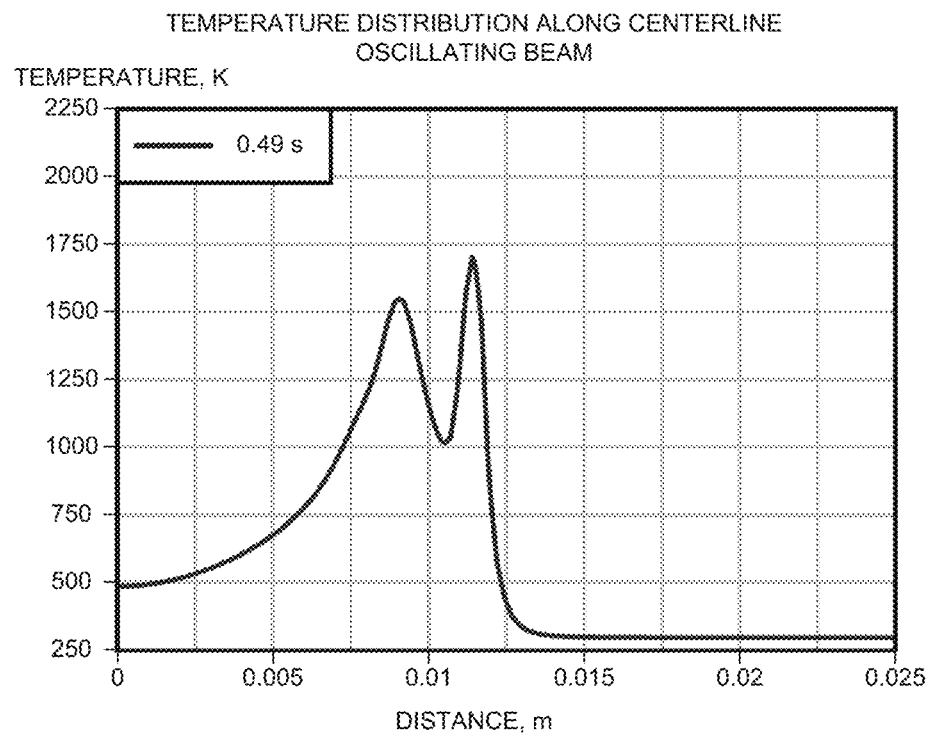
Figure 8:
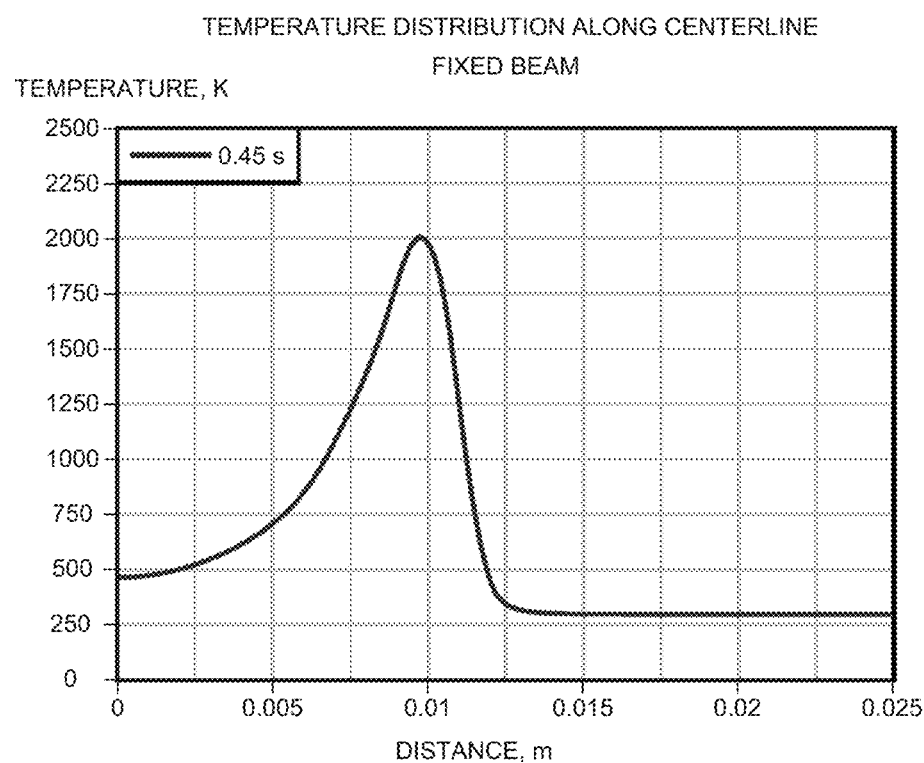
FIG. 8 illustrates the example data generated by a fixed laser beam, in accordance with aspects of this disclosure.

FIGS. 7A to 7E illustrate graphical data representing the temperature distribution along a centerline during a welding operation using an oscillating laser beam, as described with respect to FIGS. 1-6. For instance, FIG. 7A begins a 0.45 seconds into the weld operation, showing a peak between 1500 and 1750 degrees Kelvin at approximately 0.009 meters from the centerline. At 0.46 seconds, the temperature spikes above 2000 degrees Kelvin. As shown in FIGS. 7D and 7E, the temperature spikes are separated, representing the distribution of the heating profile as the laser traverses the centerline (e.g., the weld joint). By contrast, as shown in FIG. 8, a fixed beam laser will maintain a focused peak of temperature, as the weld path does not deviate from the joint.

Figures 9A, 9B:
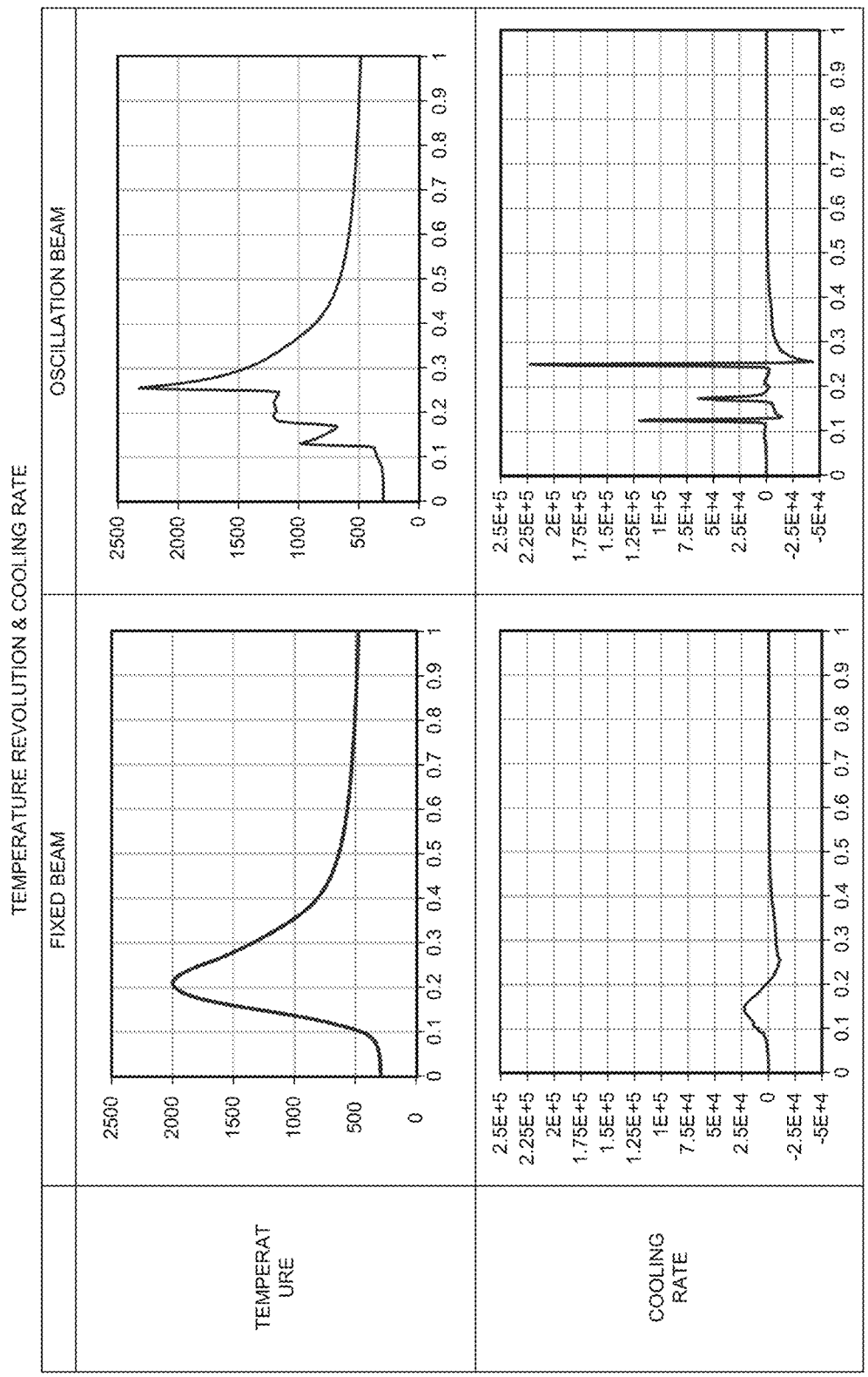
FIG. 9A illustrates example heating and cooling profiles associated with a fixed laser beam.
FIG. 9B illustrates example heating and cooling profiles associated with an oscillating laser beam, in accordance with aspects of this disclosure.
Figures 10A, 10B:
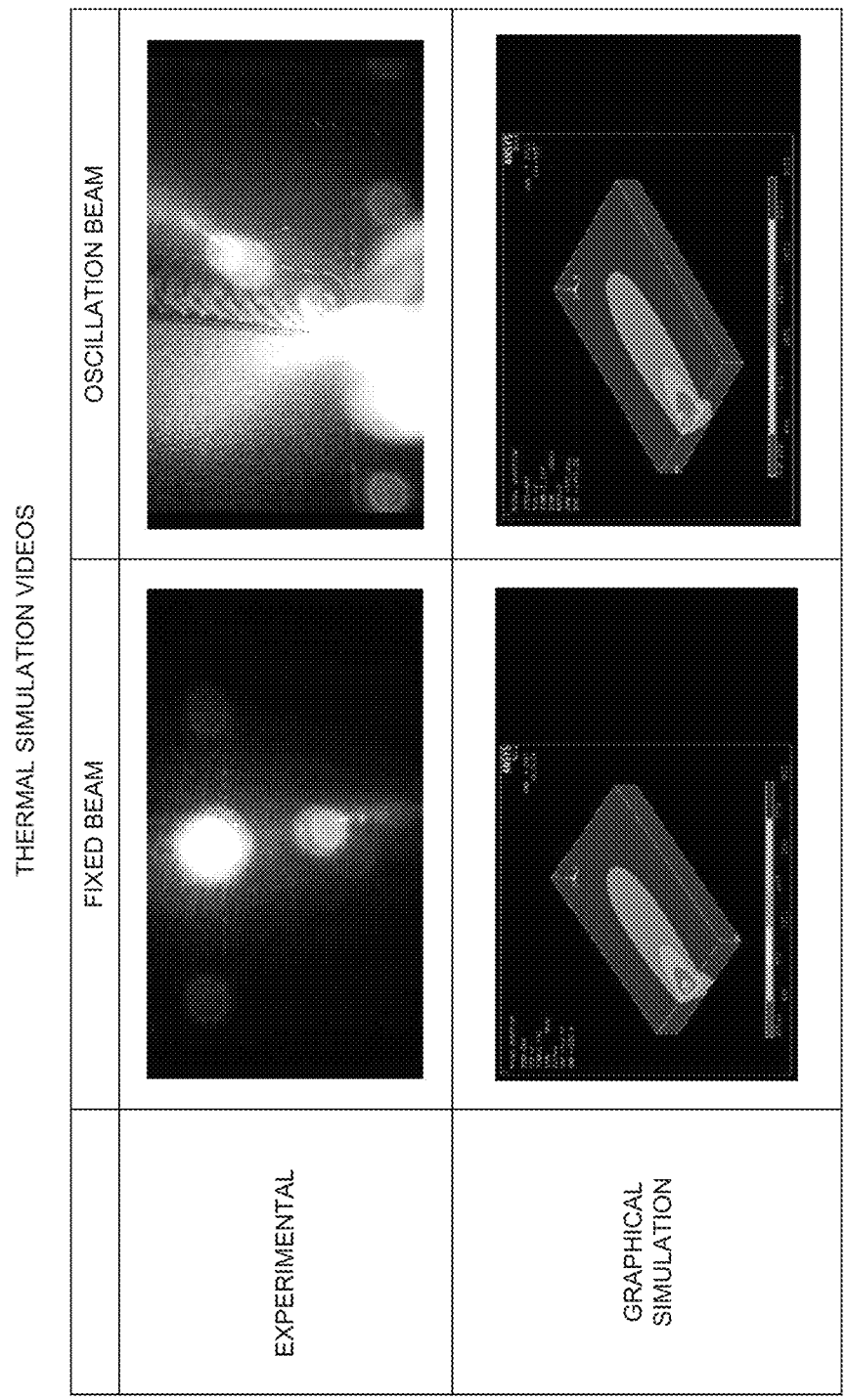
FIG. 10A illustrates example heating and cooling profiles associated with a fixed laser beam.
FIG. 10B illustrates example heating and cooling profiles associated with an oscillating laser beam, in accordance with aspects of this disclosure.

Several advantages stem from the movement of the oscillating beam. For example, compared to a heating profile and cooling rate of a fixed beam laser, shown in FIG. 9A, the heating profile is more distributed, and the cooling rate is increased in the weld puddle created by the oscillating beam, as shown in FIG. 9B. FIGS. 10A and 10B illustrate thermal simulations, represented as a video of an actual weld and a graphical representation thereof. FIGS. 10A and 10B represent a fixed beam laser weld and an oscillating beam laser weld, respectively.

Figure 11A:
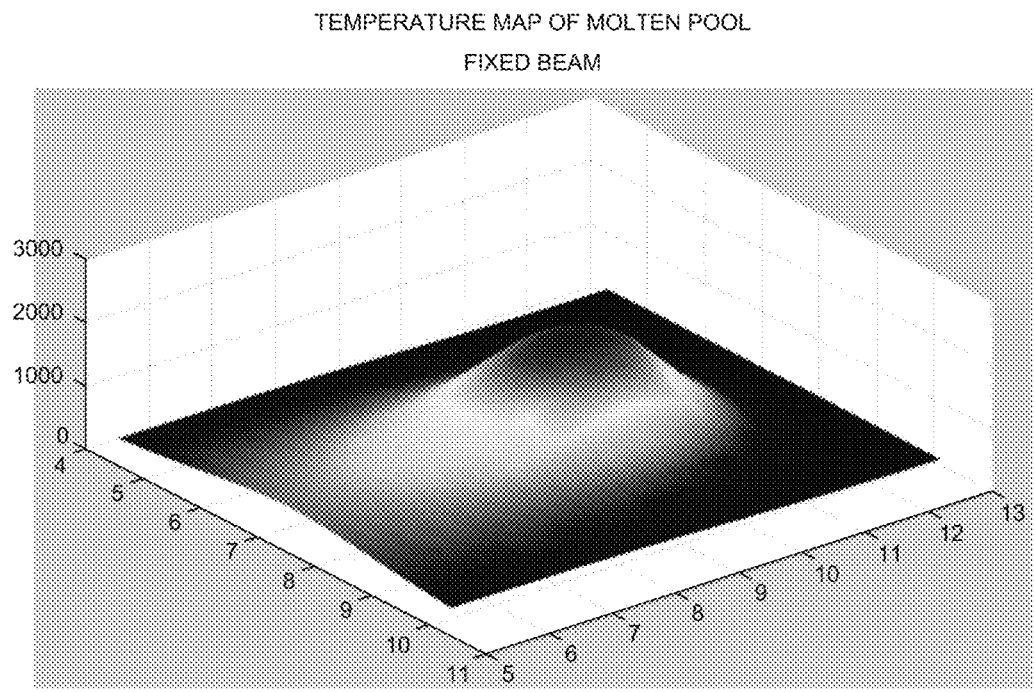
FIG. 11A illustrates an example temperature map of a molten pool generated by a fixed laser beam.
Figure 11B:
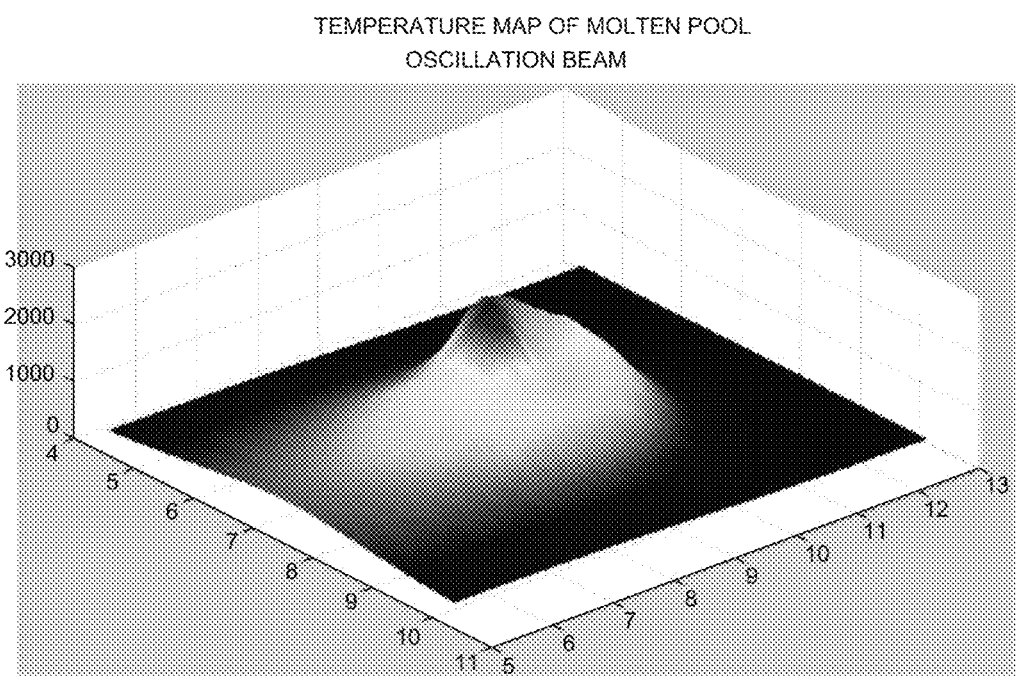
FIG. 11B illustrates an example temperature map of a molten pool generated by an oscillating laser beam, in accordance with aspects of this disclosure.

The advantageous heating profile of the oscillating weld is further illustrated in a temperature map of a molten pool, shown in FIG. 11B. As shown, the temperature peak is sharper, representing a faster cooling rate, compared with a temperature map of a molten pool generated by a fixed beam laser, shown in FIG. 11A.

Figure 12A:
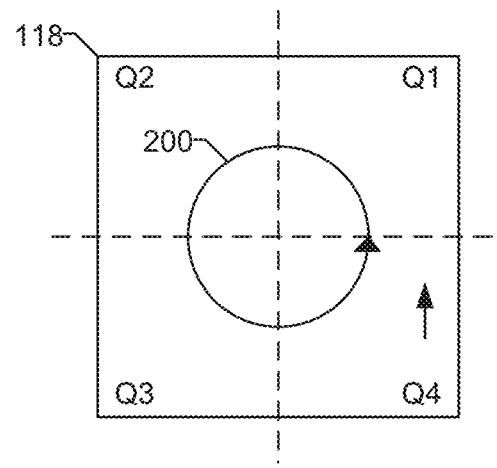
FIG. 12A illustrates the example circular pattern of FIG. 2.
Figure 12B:
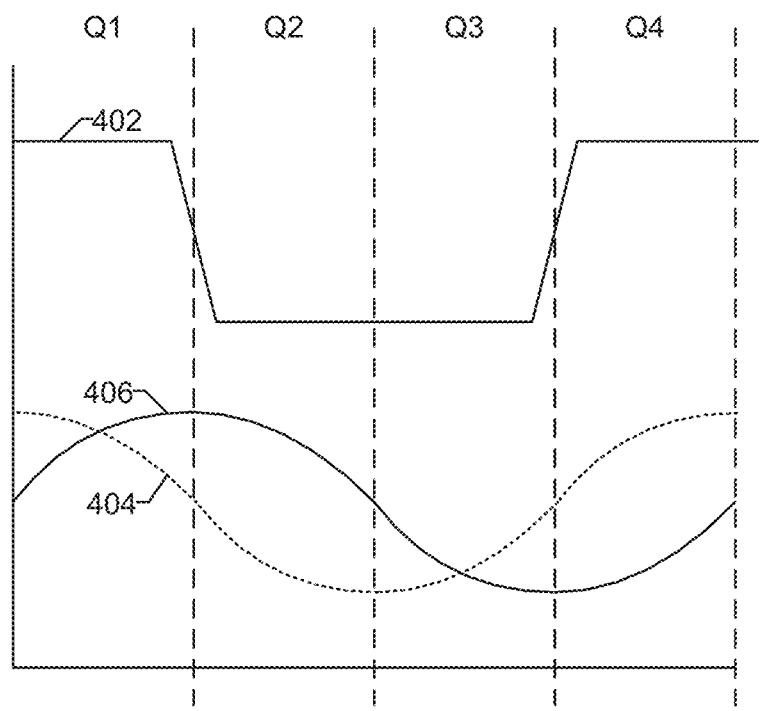
FIG. 12B illustrates example control waveforms for controlling the lasing power and the focal point, in accordance with aspects of this disclosure.

FIG. 12A illustrates the example circular pattern 200 of FIG. 2. FIG. 12B illustrates control waveforms 402, 404, 406 for controlling the lasing power 114 and the focal point 116. In the example of FIG. 12B, the waveform 402 represents the lasing power generated by the laser generator 102 and applied to the focal point. The waveform 404 represents a lateral position command provided to the laser scanner 106 to control a lateral position of the focal point 116 and the waveform 404 represents a lateral position command provided to the laser scanner 106 to control a longitudinal position of the focal point 116.

In the example of FIG. 12A, the laser generator 102 and the laser scanner 106 apply more welding-type lasing power to a first lateral portion of the workpiece 118 (e.g., than to a second lateral portion of the workpiece 118, the first and second portions of the workpiece being separated laterally and being at least partially coextensive longitudinally. more lasing power is applied to quadrants Q1 and Q4 (defined with respect to a reference, such as a center point of the boundaries focal point area) than to quadrants Q2 and Q3. As a result, different power is applied to different lateral sections of the weld path. However, other lasing power distributions may be applied using other lasing power control waveforms. For example, more lasing power may be applied to a leading edge than to a trailing edge (e.g., power being applied differently longitudinally) and/or vice versa, and/or more or less lasing power may be applied to a particular quadrant. The waveform 402 may be modified to implement any desired lasing power application.

Figure 13A:
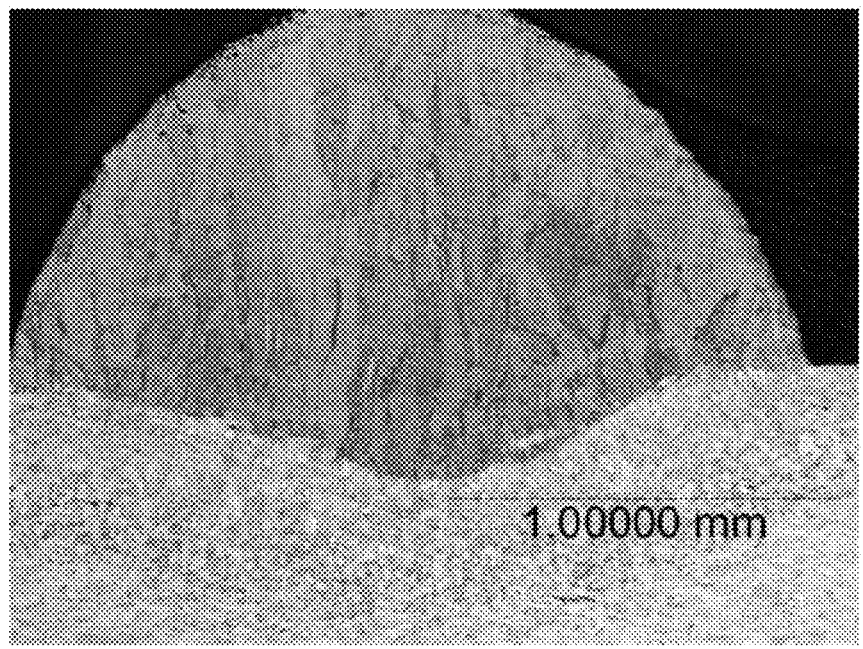
FIG. 13A illustrates a cross-sectional image of a solidified weld bead created by a fixed laser beam.
Figure 13B:
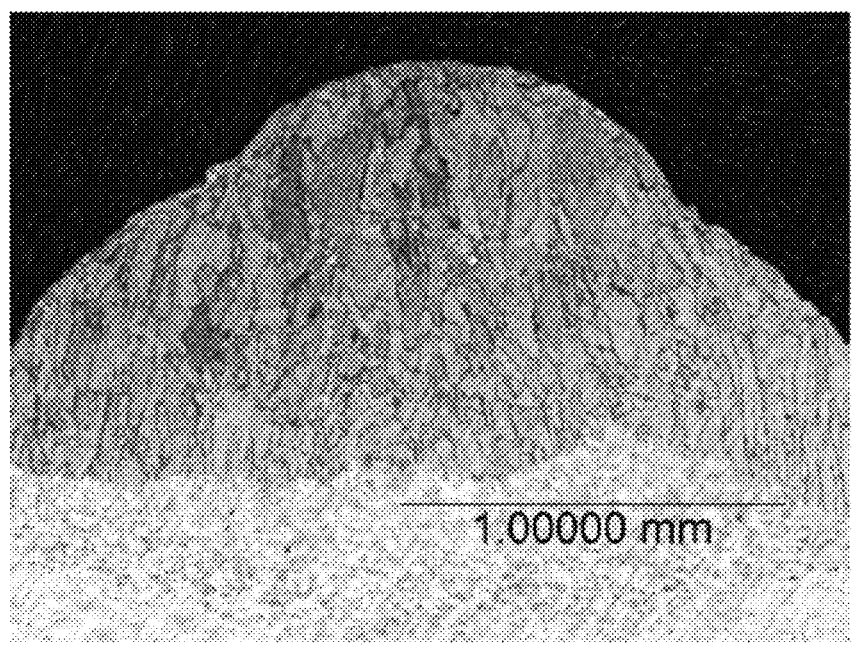
FIG. 13B illustrates a cross-sectional image of a solidified weld bead created by an oscillating laser beam, in accordance with aspects of this disclosure.

FIGS. 13A and 13B show a comparison of cross sections of solidified weld beams created by both a fixed laser beam and an oscillating laser beam, respectively.

As shown in FIG. 13A, the weld created with a fixed beam has a deeper penetration at the center. Large grains with columnar structure were generated, perpendicularly to the welding interface.

By contrast, and as shown in FIG. 13B, as a result of the oscillating laser beam, the weld has a shallower penetration and more uniform welding interface. The microstructure is finer with variant growth directions.

Figure 14:
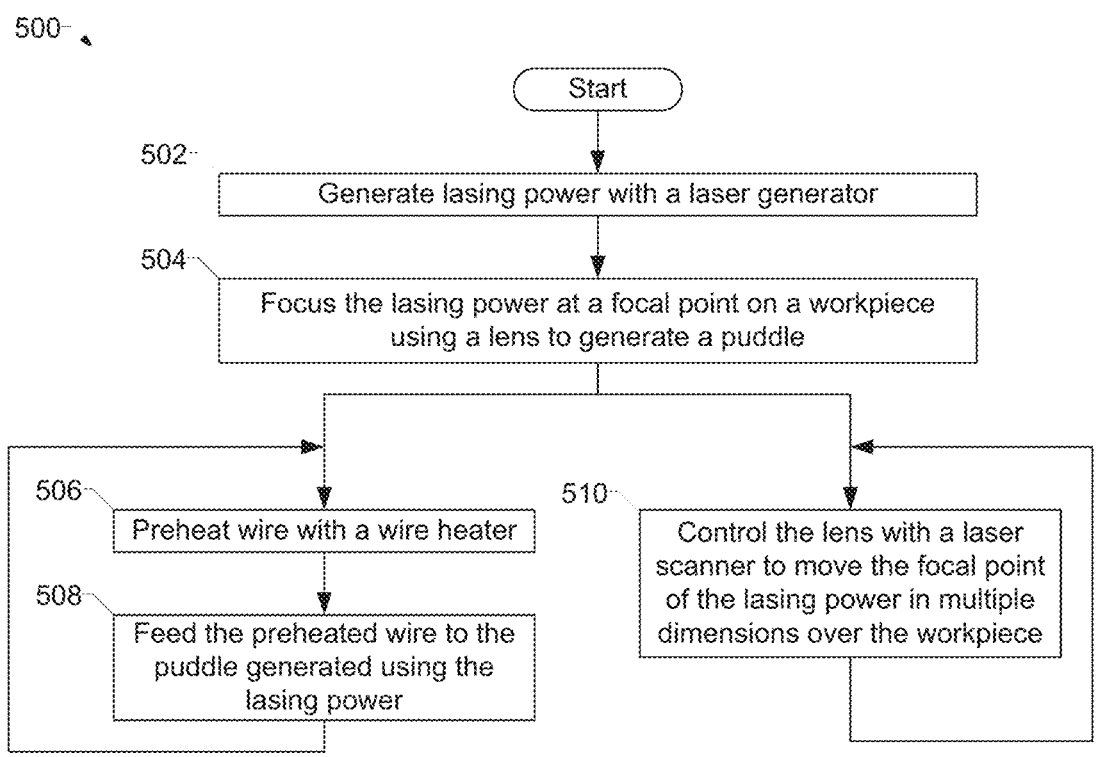
FIG. 14 is a flowchart representative of an example process to perform welding, cladding, and/or additive manufacturing operations using lasing power, in accordance with aspects of this disclosure.

FIG. 14 is a flowchart representative of an example process 500 to perform welding or cladding operations using lasing power. The example process 500 may be performed using the system 100 of FIG. 1 or another laser welding system. Block 502 involves generating lasing power with a laser generator, such as the laser generator 102 of FIG. 1. In some cases, the laser generator 102 uses a waveform to determine the lasing power at a given time. The laser generator 102 outputs the lasing power 114 to the laser scanner 106 and the lens 104. Block 504 involves focusing the lasing power 114 at a focal point 116 on a workpiece 118 using the lens 104 to generate a puddle.

In the example of FIG. 14, blocks 506 and 508 are performed contemporaneously with block 510. Block 506 involves preheating a wire with a wire heater. For example, the wire heater 108 of FIG. 1 may continually preheat portions of the wire 120 using resistive heating or another heating method as the wire feeder 123 feeds the wire 120 to the workpiece 118. Block 508 involves feeding the preheated wire 120 to the puddle generated using the lasing power 114. Because the wire 120 is preheated when it arrives at the puddle, the lasing power requirements for melting the wire 120 are reduced.

Block 510 involves controlling the lens 104 with the laser scanner 106 to move the focal point 116 in multiple dimensions over the workpiece 118. For example, the laser scanner 106 may direct the focal point 116 to form one or more patterns such as the pattern 200 of FIG. 2. Block 510 may be performed by providing positional data to a rotary wedge scanner, which directs the lasing power 114 and/or the lens 104 to move the focal point 116.

Blocks 506 and 508 and block 510 may iterate to perform a welding or cladding operation by continually preheating and delivering the wire 120 while controlling the laser scanner 510 to move the focal point 116 over the workpiece 118 in multiple dimensions.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A laser welding device, comprising:
a laser generator configured to generate welding-type lasing power;
a lens to focus the welding-type lasing power at a focal point on a workpiece to generate a puddle during a welding-type additive manufacturing operation;
a wire feeder configured to feed wire to the puddle generated by the laser generator; and
a laser scanner is configured to control the lens to:
move the focal point of the welding-type lasing power in a circular pattern within the puddle including one or more pauses or breaks in movement of the focal point in the circular pattern during application of the welding-type lasing power, such as a time interval in which the laser scanner does not move the focal point; and
advance the focal point along a weld path over the workpiece while the focal point is moved in the circular pattern within the puddle during the welding-type additive manufacturing operation, wherein the circular pattern is divided into quadrants, the welding-type lasing power at a first quadrant having a first welding-type lasing power and the welding-type lasing power at a second quadrant having a second welding-type lasing power,
wherein the first and second welding-type lasing powers are different, and
wherein the laser generator is further configured to control the welding-type lasing power to change according to the location of the focal point on the workpiece along the weld path.

2. The laser welding device as defined in claim 1, wherein the laser scanner is further configured to move the focal point in a circle, an ellipse, a zigzag, a figure-8, a crescent, a triangle, a square, a rectangle, a non-linear pattern, an asymmetrical pattern, or any combination thereof with respect to the weld path.

3. The laser welding device as defined in claim 2, wherein the movement of the focal point and relative movement between the workpiece and the laser scanner cause the lasing power to trace a superimposed pattern over the workpiece.

4. The laser welding device as defined in claim 1, wherein the laser scanner comprises a remote scan head with reflective optics or a rotary wedge scanner with transmissive optics.

5. The laser welding device as defined in claim 1, wherein the laser scanner is configured to move the focal point such that energy distribution across the weld path is changed, thereby a controllable thermal gradient and a controllable cooling rate is created in the puddle by the welding-type laser power.

6. The laser welding device as defined in claim 1, wherein the laser scanner is configured to oscillate the focal point laterally across the weld path and longitudinally in a direction parallel to the weld path.

7. The laser welding device as defined in claim 1, wherein the laser scanner is configured to move the focal point to agitate the puddle to create a heat gradient in the puddle.

8. The laser welding device as defined in claim 1, wherein the laser generator or the laser scanner are to adjust, based on a location of the focal point with respect to a reference point or feedback indicating a gap size in the workpiece, at least one of a lasing power level, a rotation speed of the laser scanner, or a size of a focal area in which the focal point is limited.

9. The laser welding device as defined in claim 1, wherein the laser generator is to generate the welding-type lasing power to perform welding or cladding.

10. The laser welding device as defined in claim 1, wherein the laser scanner is configured to cause the focal point to traverse the wire during a start of the welding-type operation such that the welding-type lasing power severs a portion of the wire, the wire feeder being oriented to feed the wire such that the severed portion of the wire falls into the puddle.

11. The laser welding device as defined in claim 1, wherein the laser generator is configured to generate the welding-type lasing power based on a lasing power waveform, and the laser scanner is configured to control the lens to move the focal point in synchrony with the lasing power waveform.

12. The laser welding device as defined in claim 11, wherein the laser generator and the laser scanner are configured to apply more welding-type lasing power to a first portion of the workpiece than to a second portion of the workpiece, the first and second portions of the workpiece being separated laterally and being at least partially coextensive longitudinally.

13. The laser welding device as defined in claim 1, further comprising a wire heater configured to preheat the wire at a location in a wire feed path that is prior to the wire tip.

14. The laser welding device as defined in claim 1, wherein advancing the focal point traces a plurality of circular patterns along the weld path, such that a trailing edge of a subsequent circular pattern overlaps a leading edge of a preceding circular pattern as the focal point advances along the weld path.

15. The laser welding device as defined in claim 1, wherein the welding-type lasing power at a third quadrant has the first welding-type lasing power and the welding-type lasing power at a fourth quadrant has the second welding-type lasing power.

16. The laser welding device as defined in claim 1, wherein the laser scanner is further configured to control the lens to:
move longitudinally along a centerline of the weld path between a leading edge and a trailing edge;
apply a first welding-type lasing power at the leading edge of the puddle; and
apply a second welding-type lasing power at the trailing edge of the weld puddle, the first welding-type lasing power being greater than the second welding-type lasing power.

17. The laser welding device as defined in claim 1, wherein the laser scanner is configured to control the lens to move the focal point independently from the workpiece.

18. A laser welding device, comprising:
a lens to focus a welding-type lasing power at a focal point on a workpiece to generate a puddle of molten metal during a welding-type additive manufacturing operation;
a wire feeder configured to feed wire to the puddle generated by the laser generator; and
a laser scanner is configured to control the lens to:
move the focal point of the welding-type lasing power in a circular pattern including one or more pauses or breaks in movement of the focal point in the circular pattern during application of the welding-type lasing power such as a time interval in which the laser scanner does not move the focal point, the movement of the focal point within the puddle creating a current of molten metal within the puddle, wherein the circular pattern is divided into first and second portions, the welding-type lasing power at the first portion having a first welding-type lasing power and the welding-type lasing power at the second portion having a second welding-type lasing power, wherein the first and second welding-type lasing powers are different, and wherein the laser generator is further configured to control the welding-type lasing power to change according to the location of the focal point on the workpiece along the weld path; and advance the focal point along a weld path to create a weld while the laser scanner moves the focal point in the circular pattern within the puddle and while the laser scanner pauses or breaks movement of the focal point.

19. The laser welding device as defined in claim 18, wherein the laser scanner controls the lens to move the focal point to oscillate within the puddle to induce a rotational pattern of molten metal flow within the puddle.

20. The laser welding device as defined in claim 18, wherein the first portion corresponds to a trailing edge along the weld path and the second portion corresponds to a leading edge of the focal point along the weld path.

* * * * *